United States Patent
Petkov et al.

(10) Patent No.: US 11,240,758 B2
(45) Date of Patent: Feb. 1, 2022

(54) METHOD FOR OPERATING AN ELECTRONIC DATA ACQUISITION DEVICE AND DATA ACQUISITION DEVICE

(71) Applicant: Diehl Metering Systems GmbH, Nuremberg (DE)

(72) Inventors: Hristo Petkov, Nuremberg (DE); Thomas Lautenbacher, Erlangen (DE); Thomas Kauppert, Nuremberg (DE); Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 139 days.

(21) Appl. No.: 16/704,177

(22) Filed: Dec. 5, 2019

(65) Prior Publication Data

US 2020/0112914 A1 Apr. 9, 2020

Related U.S. Application Data

(63) Continuation of application No. PCT/EP2018/000291, filed on Jun. 5, 2018.

(30) Foreign Application Priority Data

Jun. 14, 2017 (DE) .......................... 102017005625

(51) Int. Cl.
*H04W 52/02* (2009.01)
*H04Q 9/00* (2006.01)

(52) U.S. Cl.
CPC ............ *H04W 52/028* (2013.01); *H04Q 9/00* (2013.01); *H04W 52/0229* (2013.01);
(Continued)

(58) Field of Classification Search
CPC ......... G01P 15/18; G01P 13/00; G08C 17/02; G01D 4/02; H04W 56/00; H04W 52/0209; H04W 84/18
See application file for complete search history.

(56) References Cited

U.S. PATENT DOCUMENTS 7,535,378 B2   5/2009   Cornwall
8,861,415 B2   10/2014  Sturm et al.
(Continued)

FOREIGN PATENT DOCUMENTS

DE        10142964 A1   10/2002
DE      102009047199 A1   6/2011
(Continued)

OTHER PUBLICATIONS

Wikipedia, "Land Mobile Radio System", Sep. 25, 2019, pp. 1/4, https://en.wikipedia.org-wiki/Land_mobile_radio_system.

*Primary Examiner* — Iqbal Zaidi
(74) *Attorney, Agent, or Firm* — Laurence A. Greenberg; Werner H. Sterner; Ralph E. Locher (57) ABSTRACT

A method for operating an electronic consumption-data acquisition device includes wirelessly transferring consumption data to a receiver over a first radio system, operating the consumption-data acquisition device in a first operating mode in which the consumption data is transferred over the first radio system and a second operating mode having a lower rate of transmission and/or readiness to receive compared with the first operating mode, with it being possible to switch between the first and second operating modes. The switchover between the first and second operating modes is performed by a second radio system. A consumption-data acquisition device includes a communication module having a radio apparatus for a second radio system which can be used to perform the switchover between the first and second operating modes.

38 Claims, 6 Drawing Sheets

(52) U.S. Cl.
CPC ..... *H04Q 2209/40* (2013.01); *H04Q 2209/50* (2013.01); *H04Q 2209/60* (2013.01)

(56) References Cited

U.S. PATENT DOCUMENTS

| | | | |
|---|---|---|---|
| 9,912,441 | B2 | 3/2018 | Hald et al. |
| 2004/0219955 | A1 | 11/2004 | daCosta |
| 2007/0088495 | A1 | 4/2007 | Ibrahim |
| 2010/0207784 | A1 | 8/2010 | Bragg et al. |
| 2013/0012785 | A1* | 1/2013 | Lombardi ........... H03F 3/45475 600/301 |
| 2013/0106616 | A1 | 3/2013 | Gustafsson et al. |
| 2015/0085726 | A1* | 3/2015 | Terai .................... H04W 52/18 370/311 |
| 2016/0138492 | A1* | 5/2016 | Levy ....................... F02D 29/02 701/102 |

FOREIGN PATENT DOCUMENTS

| | | |
|---|---|---|
| DE | 102004041421 C5 | 11/2011 |
| WO | 2015074666 A1 | 5/2015 |

* cited by examiner

Changing the transmission schemes

METHOD FOR OPERATING AN ELECTRONIC DATA ACQUISITION DEVICE AND DATA ACQUISITION DEVICE

CROSS-REFERENCE TO RELATED APPLICATION

This application claims the priority, under 35 U.S.C. § 119, of German Patent Application DE 10 2017 005 625.0, filed Jun. 14, 2017, and of International Application PCT/EP2018/000291, filed Jun. 5, 2018; the prior applications are herewith incorporated by reference in their entirety.

BACKGROUND OF THE INVENTION

Field of the Invention

The present invention relates to a method for operating an electronic consumption-data acquisition device, in which the consumption data is transferred wirelessly to a receiver over a first radio system, for operating the consumption-data acquisition device, a first operating mode is provided in which the consumption data is transferred over the first radio system and a second operating mode is provided which has a lower rate of transmission and/or readiness to receive compared with the first operating mode, and in which it is possible to switch between the first operating mode and the second operating mode.

The present invention also relates to a consumption-data acquisition device including a measuring unit for acquiring the consumption data, a memory in which the consumption data can be stored, at least one processor, a communication module for transferring the consumption data, the communication module being able to transmit consumption data over a first radio system, for operating the consumption-data acquisition device, a first operating mode is provided in which the consumption data is transferred over the first radio system and a second operating mode is provided which has a lower rate of transmission and/or readiness to receive compared with the first operating mode, and in which it is possible to switch between the first operating mode and the second operating mode.

The transfer of data from measuring units such as, for instance, sensors, consumption meters or consumption-data acquisition devices, or components of smart home controllers, is becoming increasingly important in everyday use. An important area of use for measuring units is the deployment of smart consumption-data acquisition devices, also known as smart meters. They are typically consumption-data acquisition devices, e.g. for energy, electricity, gas or water, which are integrated in a supply network, and which indicate to the particular utility customer the actual consumption, and use a communication network to transfer the consumption data to the supplier. The advantage of smart consumption-data acquisition devices is that it is possible to dispense with taking meter readings manually, and the supplier can invoice more quickly on the basis of actual consumption. Shorter intervals between readings in turn means that the retail tariffs are linked more accurately to trends in market electricity prices. In addition, far better utilization of the supply networks is possible.

Consumption-data acquisition devices of the type in question transfer the accrued measurement data usually in the form of data packets or data messages by radio, for example in the SRD (Short Range Device) or ISM (Industrial, Scientific, Medical) frequency band, to higher-level data collectors (e.g. concentrators, network nodes or control centers of a supplier). Data messages are usually composed of a plurality of data packets. The SRD or ISM frequency bands have the advantage that they are unlicensed, and for use merely require general spectrum-management approval. The problem of potentially frequent interference arises, however, due to the prevalence of use of such frequency bands for a huge range of technical equipment, for instance equipment such as garage-door controllers, baby monitors, alarm installations, WLAN, Bluetooth, smoke alarms, or the like.

Electronic consumption-data acquisition devices including a radio transmitter for wireless data transfer are often used for walk-in, walk-by, drive-by or fly-by readings. For that purpose, customer service personnel use mobile radio receivers to read the acquisition devices from a passing vehicle (drive-by) or when walking past (walk-by), without having to enter the building from which the readings are meant to be obtained. There are two crucial issues associated with smart consumption-data acquisition devices: the energy consumption, because the devices are usually battery-powered and are meant to have the longest possible maintenance intervals, and the operational reliability. For the aforementioned reading procedure, radio messages are often emitted throughout the year and, in order to save electricity, are very short, allowing frequent transmission over a long time period. Nonetheless, there is still the need to reduce the power consumption of consumption-data acquisition devices.

Description of the Related Art

German Patent DE 101 42 964 B4 discloses a method for operating an electric consumption-data acquisition device as described above. That method is used to optimize the power consumption of the consumption-data acquisition devices. That is done by timed switching on and off of the data transfer according to the day of the week and/or the time of day. The switch-on and switch-off times are programmed by a service interface directly at the consumption-data acquisition device or even as early as the manufacturing stage.

German Patent DE 10 2004 041 421 C5 describes a method for radio transmission of consumption data from a consumption-data acquisition device to receivers. That method transmits consumption data by using two transmission modes: the first transmission mode uses a spread spectrum technique and the second transmission mode uses channel coding without code multiplexing. The aim of that method is to adjust the transmitters to suit the reading requirements.

International Publication WO 2015/074666 A1, corresponding to U.S. Pat. No. 9,912,441, describes a device for transferring consumption data, which encodes and transmits the consumption data as two-part data messages. In that case, the two parts of the data message have different transmit ranges.

SUMMARY OF THE INVENTION

It is accordingly an object of the invention to provide a new method and a consumption-data acquisition device, which overcome the hereinafore-mentioned disadvantages of the heretofore-known methods and devices of this general type and which allow increased operating flexibility with less frequent maintenance in parallel with advantageous energy efficiency.

With the foregoing and other objects in view there is provided, in accordance with the invention, a method for operating an electronic consumption-data acquisition device, wherein the consumption data is transferred wirelessly to a receiver over a first radio system, and wherein for operating the consumption-data acquisition device, a first operating mode is provided, in which the consumption data is transferred over the first radio system, and a second operating mode is provided, which has a lower rate of transmission and/or readiness to receive compared with the first operating mode, and it is possible to switch between the first operating mode and the second operating mode, in which the switchover of first and second operating modes is performed by using a second radio system.

According to the invention, a first operating mode is provided, in which the consumption data is transferred over a first radio system, and a second operating mode is provided, which has a lower rate of transmission and/or readiness to receive compared with the first operating mode. There is the facility to switch between the first operating mode and the second operating mode. This switchover of first and second operating modes is performed by a second radio system, which can, for instance, be a low-energy radio system. It is thereby possible to increase the operating flexibility because, for example, even after installation, the switch-on and switch-off times of the consumption-data acquisition devices can be set and/or changed by transmitting relevant control signals over the second radio system, for instance from the control center of the supplier, to the consumption-data acquisition device. Hence, there is no need for on-site servicing in order to make subsequent changes to the switch-on and switch-off times. In addition, the method makes the operation of a consumption-data acquisition device more energy-efficient by, for example, the switchover into the first operating mode being necessary only when a receiver is in the vicinity, i.e. within range of the first radio system, for instance when a drive-by reading is imminent. Thus, there is no commitment to programmed switch-on and switch-off times, which have been set, for instance, back at the manufacturing stage of the consumption-data acquisition device.

The second radio system can preferably have a larger range compared with the first radio system. This has the advantage that, proceeding from a central transmit unit, e.g. a communication unit of the second radio system and/or of the control center of the supplier, a larger number of consumption-data acquisition devices can be accessed over the second radio system, i.e. comprehensive communication with the consumption-data acquisition devices can be achieved. Consequently, comprehensive communication can be provided by relatively few central transmit units of the second radio system.

At the consumption-data acquisition device, the second operating mode can involve lower power consumption in non-transmit mode compared with the first operating mode because the consumption-data acquisition device in the second operating mode does not transmit over the first radio system. The consumption-data acquisition device can hence be addressed over the second radio system, while functions that have a higher power consumption, for instance functions such as transmitting the consumption data over the first radio system, can be deactivated. The second operating mode can thus be an energy-saving mode or standby mode.

The fact that the transfer capability or activation capability is maintained over the second radio system means that the first radio system can be deactivated at least partially, preferably in full.

The times of the switchover between first and second operating modes can preferably be alterable individually, which means, for example, that there is no commitment to a programmed schedule. Thus, the switchover can be made dependent solely on the planned transfers of the consumption data.

In one embodiment, the switchover between first and second operating modes also includes enabling the first radio system. The enabling is necessary, for example, in the case in which the first radio system is partially or fully in the deactivated state in the second operating mode. In addition, the switchover can also include disabling the first radio system.

It can also be provided to store at least one transmission schedule in the consumption-data acquisition device. This transmission schedule can preferably be configured and/or activated and/or deactivated over the second radio system. The transmission schedule contains, for instance, the times at which the consumption data is meant to be transmitted over the first radio system. It is hence possible, for instance, to respond to a route change for a mobile drive-by reading by reconfiguring the transmission schedule over the second radio system. In addition, more than one transmission schedule can expediently be stored in the consumption-data acquisition device, with it being possible to configure and/or activate and/or deactivate each of the transmission schedules as required over the second radio system.

In another embodiment of the method, it is possible to configure the parameters of the first radio system over the second radio system. The configuring of the parameters can preferably include adjusting the transfer capacity by efficient use of the frequency spectrum and/or adjusting the radio transmission to suit the capacity requirement. Alternatively or additionally, it is also expediently possible to adjust transmission schemes relating, for example, to the time intervals between repeat transmissions in the first radio system. It is hence possible, for example, to improve as required the transfer of the consumption data over the first radio system by increasing the rate of repeat transmissions during a drive-by reading.

The frequency band used by the first radio system can preferably include the SRD frequency band and/or the ISM frequency band.

The consumption data can expediently be conveyed to the receiver by a multiplicity of individual consumption-data acquisition devices.

Each individual consumption-data acquisition device of the multiplicity of consumption-data acquisition devices can preferably have an individual transmission schedule. This transmission schedule is adjusted, for example, to suit the route of a mobile drive-by reading.

Furthermore, the capability expediently exists to select from the aforementioned multiplicity of consumption-data acquisition devices, by using the second radio system, an individual consumption-data acquisition device which is switched between the first operating mode and the second operating mode. In particular, it is possible to control individually, i.e. actuate individually, from a central transmit unit, a multiplicity of consumption-data acquisition devices over the second radio system. It is thereby possible, for example, to respond flexibly and quickly to an unplanned change in the route of the drive-by reading of the consumption-data acquisition devices by performing and monitoring the switchover between the first operating mode and the second operating mode from a central location, without each individual consumption-data acquisition device having to be adjusted locally.

The receiver may expediently be a mobile data collector or a stationary data collector. The mobile data collector is used expediently for drive-by readings, for example.

With the objects of the invention in view, there is also provided a consumption-data acquisition device including a measuring unit for acquiring the consumption data, a memory, in which the consumption data can be stored, at least one processor, a communication module for transferring the consumption data, the communication module being able to transmit consumption data over a first radio system, and for operating the consumption-data acquisition device, a first operating mode is provided, in which the consumption data is transferred over the first radio system, and a second operating mode is provided, which has a lower rate of transmission and/or readiness to receive compared with the first operating mode, in which it is possible to switch between the first operating mode and the second operating mode and the communication module has a radio apparatus for a second radio system which can be used to perform the switchover of first and second operating modes.

It is thereby possible, for example, to set and, if required, even alter the switch-on and switch-off times even after the consumption-data acquisition device has been installed, by transmitting these times over the second radio system, for instance from a control center of the supplier to the consumption-data acquisition device. This increases the operating flexibility and there is no longer any need to service the consumption-data acquisition device on site in order to change the switch-on and switch-off times. In addition, the operation of a consumption-data acquisition device becomes more energy-efficient by, for example, switching into the first operating mode only when a receiver is in the vicinity, i.e. within range of the first radio system, for instance when a drive-by reading is imminent.

The second radio system can preferably have a larger range compared with the first radio system.

The second operating mode at the consumption-data acquisition device can expediently result in a lower power consumption compared with the first operating mode.

In the second operating mode of the consumption-data acquisition device, the first radio system preferably can be at least partially, preferably fully, in the deactivated state.

The switchover between first and second operating modes at the consumption-data acquisition device can expediently include enabling and/or disabling the first radio system.

According to another embodiment, at least one transmission schedule is stored in the memory of the consumption-data acquisition device, which transmission schedule can be configured and/or activated and/or deactivated over the second radio system.

Parameters of the first radio system can preferably be configured in the consumption-data acquisition device over the second radio system.

The first radio system of the consumption-data acquisition device can expediently use an SRD frequency band and/or an ISM frequency band.

Other features which are considered as characteristic for the invention are set forth in the appended claims.

Although the invention is illustrated and described herein as embodied in Method for operating an electronic data acquisition device, and data acquisition device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
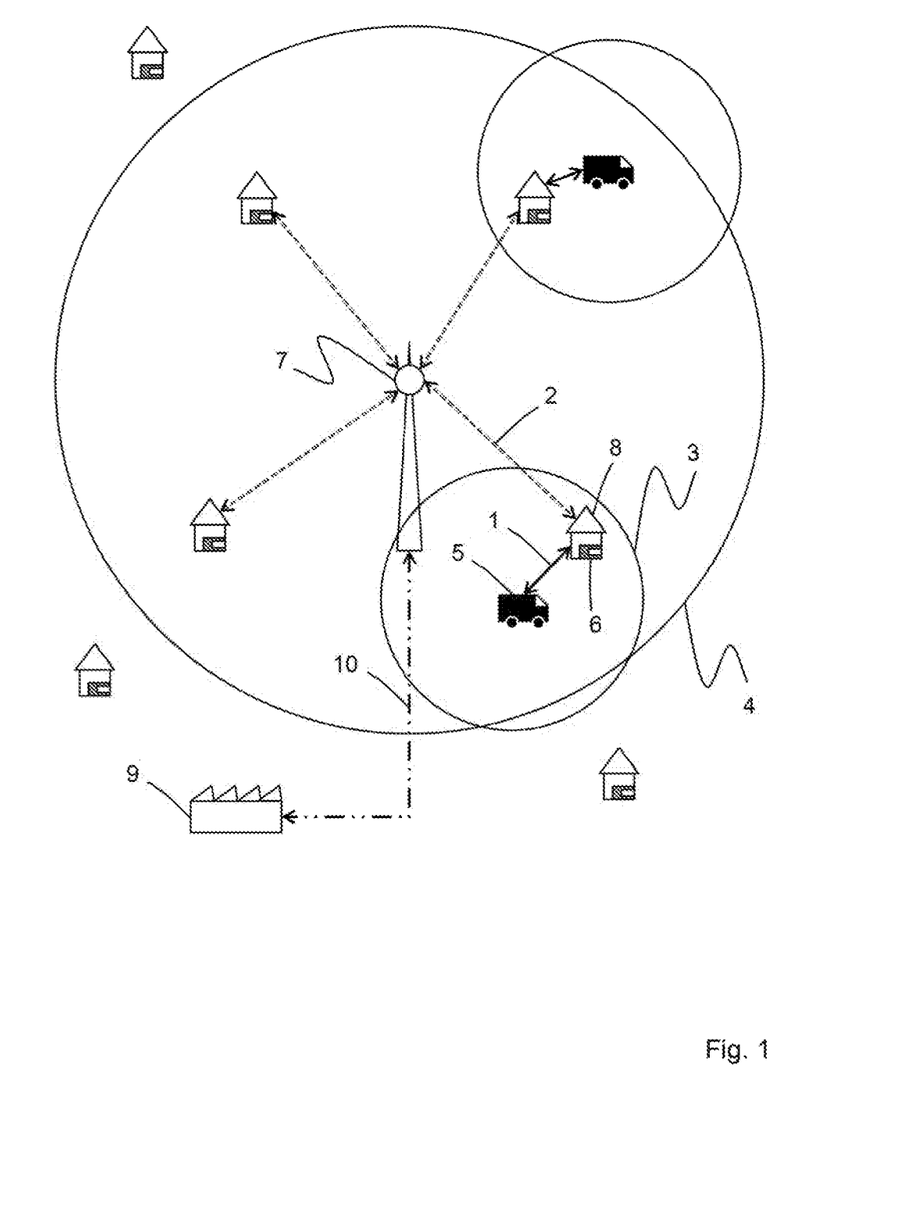
FIG. 1 is a highly simplified schematic diagram of a plurality of consumption-data acquisition devices, each of which communicate over a first radio system with a mobile data collector within range and additionally over a second radio system with a communication unit of the second radio system.

Referring now to the figures of the drawings in detail and first, particularly, to FIG. 1 thereof, there is seen a first radio system 1, for instance a wireless M-bus. The arrows at both ends indicate the radio transmission. The radius of the circle denoted by reference number 3 in this case represents schematically the maximum radio range of the first radio system 1. Similarly, the circle 4 indicates the maximum radio range of a second radio system 2, for example a low power wide area network (LPWAN) such as Sigfox or LoRaWAN, for instance. Any radio systems can expediently be combined for the first radio system 1 and the second radio system 2.

Consumption-data acquisition devices 6 include respective radio apparatuses 18 and 19 for the first and second radio systems 1 and 2. In addition, two operating modes 11 and 12 are provided for the consumption-data acquisition devices 6. In the first operating mode 11, communication is possible by the first and second radio systems 1 and 2 respectively (data transfer mode). In the second operating mode 12, the first radio system 1 is preferably in the deactivated state in order to save energy (energy-saving mode). Signals over the second radio system 2 can be used to switch between the first operating mode 11 and the second operating mode 12.

Communication over the first radio system 1 takes place between a data collector 5 and a plurality of individual consumption-data acquisition devices 6. The particular consumption-data acquisition device 6 conveys the latest individual meter status in the form of consumption data over the first radio system 1 to the data collector 5. The data collector 5 can be operated in a stationary manner or, as shown by way of example in FIG. 1, installed as a mobile unit in a vehicle. The consumption-data acquisition devices 6 are preferably installed in buildings 8 in a stationary manner. The buildings 8 may be any type of building. Consumption-data acquisition devices 6 located within the radio range 3 of the first radio system 1 convey data to the data collector 5 over the first radio system 1. If the consumption-data acquisition devices 6 are located outside the radio range 3, no data can be conveyed over the first radio system 1 to the data collector 5.

A communication unit 7 of the second radio system 2 is provided for communication over the second radio system 2. The communication unit 7 of the second radio system 2 is preferably located on high ground, a high building, a tower, for example in a television tower, or a comparable location suitable for radio transmission. In FIG. 1, the communication unit 7 is located in a television tower. The communication unit 7 of the second radio system 2 is in contact with a control center 9 of an energy supplier. Control signals are conveyed from this control center by a signal transmission 10. The control signals include switchover signals 21 and 22 in order to switch between the first operating mode 11 and the second operating mode 12 of the consumption-data acquisition device 6. The embodiment of the signal transmission 10 can be implemented by a cable connection or a radio transmission. Consumption-data acquisition devices 6 that are located within the radio range 4 of the second radio system 2 can communicate over the second radio system 2 with the communication unit 7 of the second radio system 2. The consumption-data acquisition devices 6 outside the radio range 4 cannot communicate with the communication unit 7 over the second radio system 2.

Figure 2:
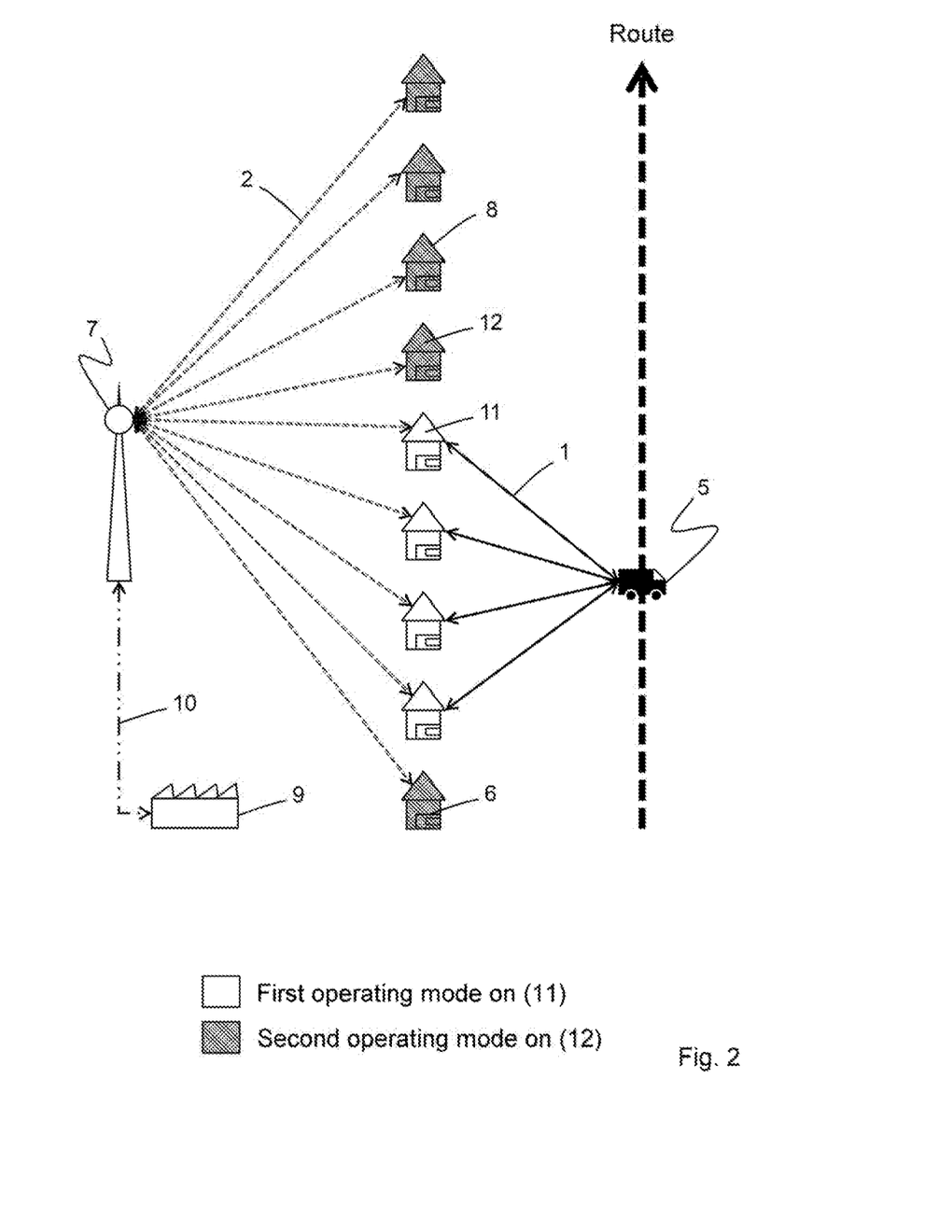
FIG. 2 is a schematic diagram showing the switchover between a first operating mode and a second operating mode according to the route of a mobile data collector.

FIG. 2 shows by way of example the switchover between the respective first and second operating modes 11 and 12 of the consumption-data acquisition device 6 according to the route of the mobile data collector 5. All of the consumption-data acquisition devices 6 are in communication with the communication unit 7 of the second radio system 2 over the second radio system 2. The control center 9 of the supplier switches the respective operating modes 11 and 12 of the consumption-data acquisition devices 6 between the first operating mode 11 and the second operating mode 12 according to the route of the mobile data collector 5. Thus, the consumption-data acquisition devices 6 located on the route but not yet within radio range 3 of the first radio system 1 are in the second operating mode 12, i.e. in the operating mode having reduced energy consumption. If the mobile data collector 5 comes close to the radio range 3 of the first radio system 1 of an individual consumption-data acquisition device 6, the control center 9 switches this device into the first operating mode 11. Once the mobile data collector 5 is no longer within the radio range 3 of the first radio system 1 for the consumption-data acquisition device 6, the control center 9 switches over this device into the second operating mode 12 again over the second radio system 2.

Figure 3:
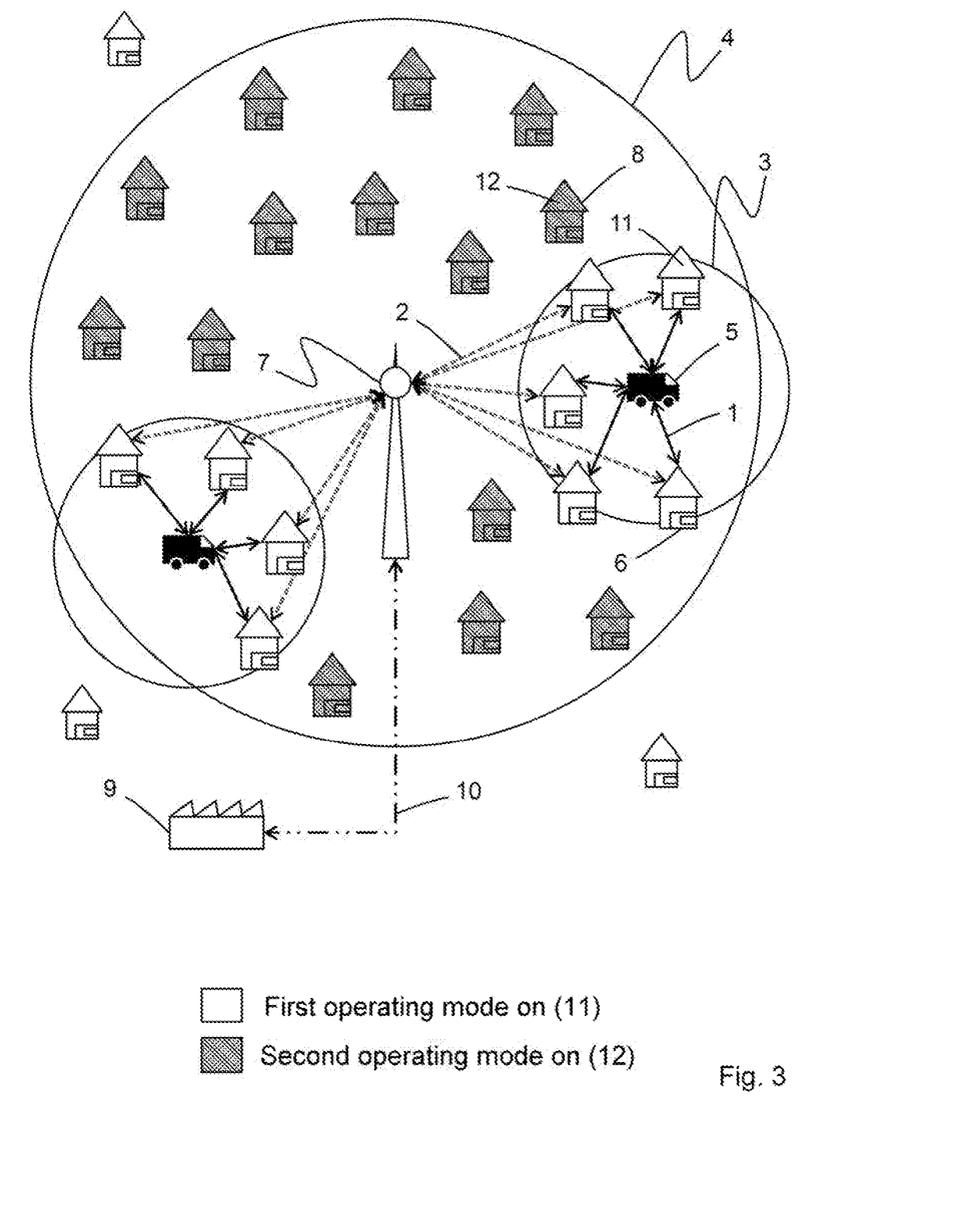
FIG. 3 is a schematic diagram showing the switchover between a first operating mode and a second operating mode according to the presence of a mobile data collector in the vicinity of a consumption-data acquisition device.

FIG. 3 shows an expedient embodiment of the method according to the invention. It is possible to switch selectively between the first operating mode 11 and the second operating mode 12 over the second radio system 2. Thus, FIG. 3 shows by way of example the possibility of switching between the respective first and second operating modes 11 and 12 of the consumption-data acquisition devices 6 within the radio range 4 of the second radio system 2. In order to save energy, the consumption-data acquisition devices 6 that are in the first operating mode 11 but not within the radio range 3 of the first radio system 1 of a data collector 5 are switched into the second operating mode 12 over the second radio system 2. Conversely, if it is planned to read the consumption-data acquisition devices 6 over the first radio system 1, for example by walk-by or drive-by, the consumption-data acquisition devices 6 that are in the radio range 3 or located on the planned route of the relevant data collector 5 are switched into the first operating mode 11 over the second radio system 2. FIG. 3 also shows the contact of the communication unit 7 of the second radio system 2 with the control center 9 over the signal transmission 10.

Figure 4:
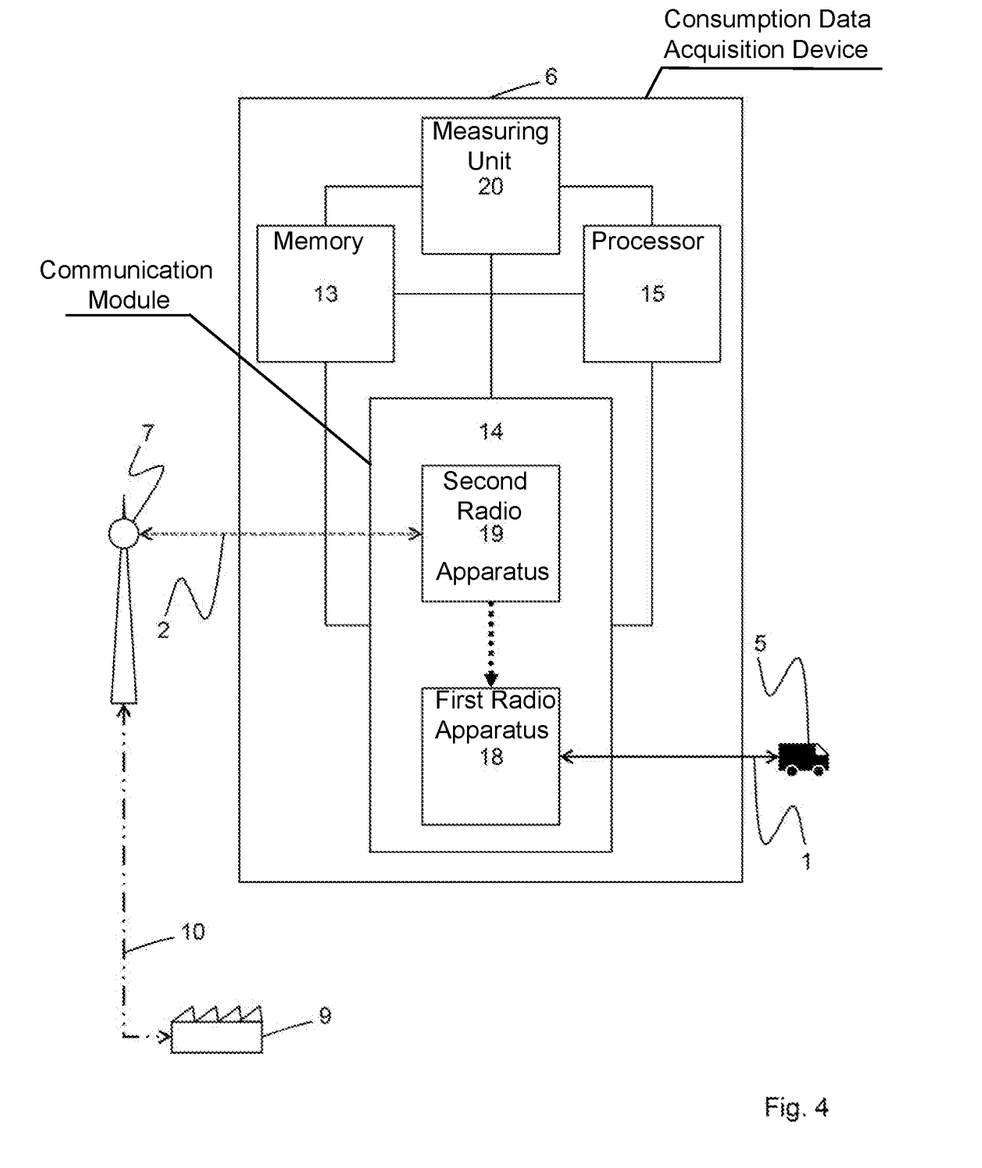
FIG. 4 is a highly simplified block diagram of an embodiment of the consumption-data acquisition device and the components thereof.

FIG. 4 shows, as a block diagram, an expedient embodiment of the consumption-data acquisition device 6 according to the invention, and the internal communication thereof. The consumption-data acquisition device 6 includes a memory 13, a communication module 14, a processor 15, a first radio apparatus 18 for the first radio system 1, a second radio apparatus 19 for the second radio system 2, and a measuring unit 20 for acquiring the consumption data. The communication module 14 is configured to process the data into radio messages. The communication module 14 also includes the respective first and second radio apparatuses 18 and 19. The respective first and second radio apparatuses 18 and 19 can also be in the physical form of a radio chip and can be separate merely in terms of logic. In addition, the communication module 14 could expediently include a further dedicated processor in addition to the processor 15 shown. The first radio apparatus 18 is in communication with the data collector 5 over the first radio system 1. The second radio apparatus 19 is in communication with the communication unit 7 over the second radio system 2. The communication unit 7 is in turn in communication with the control center 9 over the signal transmission 10. The first radio apparatus 18 is in internal communication with the second radio apparatus 19. In one embodiment, the signals received in the second radio system 19 over the second radio system 2 can influence or change the functions and the parameters of the first radio apparatus 18 for the first radio system 1.

Figure 5:
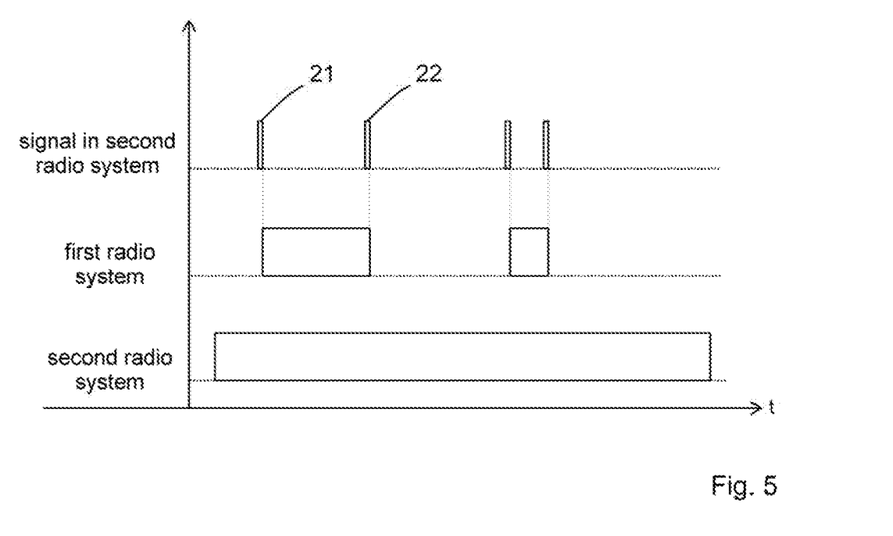
FIG. 5 is a timing diagram of the operation of the first and second radio systems during the switchover from the first operating mode into the second operating mode.
Figure 6:
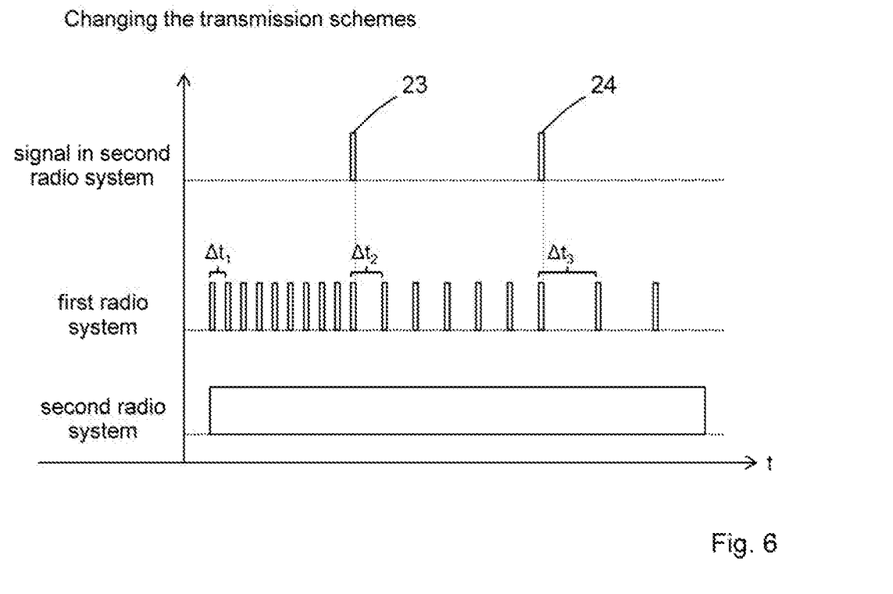
FIG. 6 is a timing diagram when parameters relating to the transmission schemes of the first radio system are changed by the second radio system.

FIG. 5 and FIG. 6 show timing diagrams of the first radio system 1 and of the second radio system 2.

FIG. 5 shows the switchover of the respective first and second operating modes 11 and 12. The switchover between the operating modes 11 and 12 results in the first radio system 1 being activated or deactivated by the second radio system 2. The second radio system 2 is preferably permanently in the activated state. The consumption-data acquisition device 6 is in the second operating mode 12, with the first radio system 1 in the deactivated state, i.e. in the energy-saving mode. With a first signal, e.g. an enable signal 21, over the second radio system 2, a switchover is made from the second operating mode 12 into the first operating mode 11. This activates the first radio system 1. Now, for example, consumption data can be transmitted from the consumption-data acquisition device 6 to a data collector 5 over the first radio system 1. With the second signal of the second radio system 2, e.g. a disable signal 22, a switchover is made from the first operating mode 11 into the second operating mode 12. This deactivates the first radio system 1. Consumption data can no longer be transmitted over the first radio system 1. Similarly, with the third and fourth signals over the second radio system 2, a switchover is made between the first operating mode 11 and the second operating mode 12. The timespan in which the consumption-data acquisition device 6 is in the first operating mode 11 and thus the first radio system 1 is in the activated state can be altered individually to suit, as shown in FIG. 5. For example, the second signal, i.e. the disable signal 22, can be generated automatically after a predetermined timespan.

FIG. 6 shows, schematically by way of example, the switchover between different transmission schemes, on the basis of which the consumption data is transferred over the first radio system 1. The second radio system 2 is permanently in the activated state. In FIG. 6, the consumption-data acquisition device 6 is initially in the first operating mode 11, i.e. the first radio system 1 and the second radio system 2 are in the activated state. The first radio system 1 transmits the consumption data initially at a time interval between repeat transmissions of $\Delta t_1$, where $\Delta t_1$ equals 5 seconds for example. Parameters of the first radio apparatus 18 for the first radio system 1 are configured by a first configuration signal 23 (transmitted over the second radio system 2), for example in this case after ten repeat transmissions at time intervals of $\Delta t_1$. In FIG. 6, by way of example, the configurable parameter is the time interval $\Delta t$ between repeat transmissions of the first radio system 1. Thus, the first radio apparatus 18 for the first radio system 1 from then on, after the configuration signal 23, transmits at a time interval $\Delta t_2$ between repeat transmissions. The time interval $\Delta t_2$ is 10 seconds long, for example. For a mobile drive-by reading, a higher rate of repeat transmissions (i.e. shorter time intervals $\Delta t$) is normally needed for transferring the consumption data than for a reading by using a stationary data collector 5. Thus, in this example, the time intervals $\Delta t_1$ and $\Delta t_2$ between repeat transmissions are suitable for reading the consumption-data acquisition device 6 by using a mobile data collector 5. After a second configuration signal 24 over the second radio system 2, the time interval between repeat transmissions of the first radio system 1 is set to $\Delta t_3$ for example in this figure. The time interval $\Delta t_3$ in this example is significantly longer than $\Delta t_1$ or $\Delta t_2$, at 10 minutes, for example. The time interval $\Delta t_3$ between repeat transmissions of the first radio system 1 is suitable, for example, for a reading by using a stationary data collector 5. The time intervals $\Delta t_1$ to $\Delta t_3$ between repeat transmissions are not shown to scale.

Figure 7:
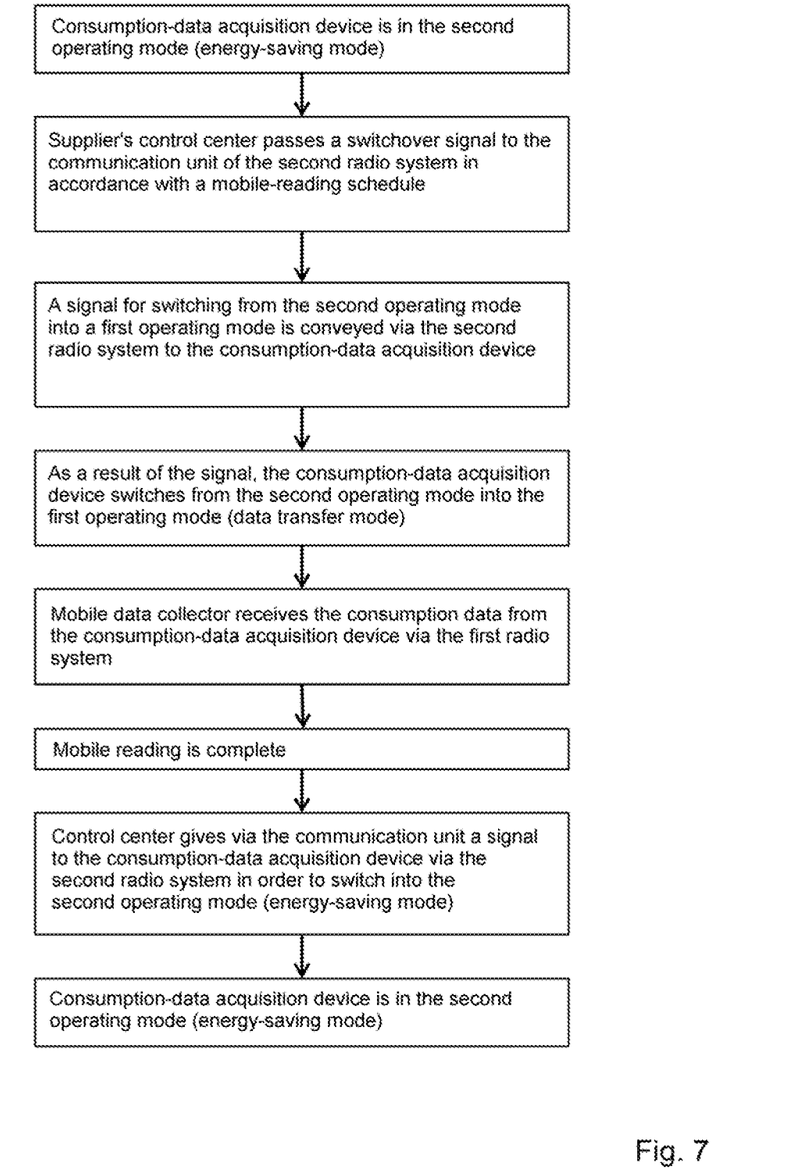
FIG. 7 is an exemplary flow diagram of expedient steps for switching from the second operating mode into the first operating mode for reading the consumption data.

FIG. 7 shows a flow procedure as an example of how the method according to the invention and the consumption-data acquisition device 6 according to the invention are used. The consumption-data acquisition device 6 is initially in the second operating mode 12, with the first radio system 1 disabled and the second radio system 2 enabled, i.e. in energy-saving mode. In the second step, the control center 9 passes a switchover signal to the communication unit 7 in accordance with a schedule for the mobile reading. In the third step, a signal for switching from the second operating mode 12 into the first operating mode 11 is thereby conveyed over the second radio system 2 to the consumption-data acquisition device 6. In the next step, as a result of the preceding signal, the consumption-data acquisition device 6 switches from the second operating mode 12 into the first operating mode 11, with the first radio system 1 and second radio system 2 enabled, i.e. in data transfer mode. In the fifth step, the mobile data collector 5 can receive the consumption data from the consumption-data acquisition device 6 over the first radio system 1. Once the reading is complete, the control center 9 provides, over the communication unit 7, a signal to the consumption-data acquisition device 6 over the second radio system 2 in order to switch into the second operating mode 12, the energy-saving mode. In the final step, the consumption-data acquisition device 6 is again in the second operating mode 12, i.e. in energy-saving mode, with the first radio system 1 disabled and the second radio system 2 enabled.

The disclosure also explicitly includes individual feature combinations (sub-combinations) and possible combinations of individual features of different embodiments, which possible combinations are not presented in the drawing figures.

LIST OF REFERENCE NUMERALS 1 first radio system
2 second radio system
3 radio range of the first radio system
4 radio range of the second radio system
5 data collector
6 consumption-data acquisition device
7 communication unit of the second radio system
8 building
9 control center
10 signal transmission
11 first operating mode enabled
12 second operating mode enabled
13 memory
14 communication module
15 processor
18 radio apparatus for the first radio system
19 radio apparatus for the second radio system
20 measuring unit for acquiring the consumption data
21 enable signal for the first radio system over the second radio system
22 disable signal for the first radio system over the second radio system
23 first configuration signal
24 second configuration signal

The invention claimed is:

1. A method for operating an electronic consumption-data acquisition device, the method comprising the following steps:
   using a first radio system to wirelessly transfer consumption data to a receiver;
   providing a first operating mode for operating the consumption-data acquisition device, and transferring the consumption data by using the first radio system in the first operating mode;
   providing a second operating mode for operating the consumption-data acquisition device, and providing the second operating mode with a lower rate of at least one of transmission or readiness to receive data compared with the first operating mode;
   using a second radio system to switchover between the first operating mode and the second operating mode; and
   providing the second radio system with a larger range than the first radio system.

2. The method according to claim 1, which further comprises providing the second operating mode of the consumption-data acquisition device with a lower power consumption in a non-transmit mode than the first operating mode.

3. The method according to claim 1, which further comprises placing the first radio system partially or fully in a deactivated state in the second operating mode.

4. The method according to claim 1, which further comprises individually altering switchover times between the first and second operating modes according to a planned transfer of the consumption data.

5. The method according to claim 1, which further comprises including at least one of enabling or disabling of the first radio system in the switchover between the first and second operating modes.

6. The method according to claim 1, which further comprises storing at least one transmission schedule in the consumption-data acquisition device, and using the second radio system to at least one of configure or activate or deactivate the transmission schedule.

7. The method according to claim 1, which further comprises using the second radio system to configure parameters of the first radio system.

8. The method according to claim 1, which further comprises using at least one of a Short Range Device frequency band or an Industrial, Scientific, Medical frequency band for the first radio system.

9. The method according to claim 1, which further comprises providing a multiplicity of individual consumption-data acquisition devices for conveying the consumption data to the receiver.

10. The method according to claim 9, which further comprises providing the individual consumption-data acquisition devices with individual transmission schedules.

11. The method according to claim 9, which further comprises using the second radio system to select from the multiplicity of consumption-data acquisition devices an individual consumption-data acquisition device being switched between the first operating mode and the second operating mode.

12. The method according to claim 1, which further comprises providing a mobile data collector or a stationary data collector as the receiver.

13. A consumption-data acquisition device, comprising:
a first radio system;
a first operating mode for operating the consumption-data acquisition device to transfer consumption data over said first radio system;
a second operating mode for operating the consumption-data acquisition device with at least one of a lower rate of transmission or readiness to receive data compared with the first operating mode;
a second radio system performing a switchover between said first and second operating modes;
a measuring unit for acquiring the consumption data;
a memory connected to said measuring unit for storing the consumption data;
at least one processor connected to said measuring unit; and
a communication module connected to said measuring unit for transferring the consumption data over said first radio system, said communication module having a radio apparatus for said second radio system,
said second radio system having a larger range than said first radio system.

14. The consumption-data acquisition device according to claim 13, wherein the second operating mode of the consumption-data acquisition device has a lower power consumption in a non-transmit mode than the first operating mode.

15. The consumption-data acquisition device according to claim 13, wherein said first radio system is partially or fully in a deactivated state in the second operating mode.

16. The consumption-data acquisition device according to claim 13, wherein the switchover between the first and second operating modes includes at least one of enabling or disabling said first radio system.

17. The consumption-data acquisition device according to claim 13, wherein said memory stores at least one transmission schedule to be at least one of configured or activated or deactivated over said second radio system.

18. The consumption-data acquisition device according to claim 13, wherein said first radio system has parameters to be configured over said second radio system.

19. The consumption-data acquisition device according to claim 13, wherein said first radio system uses at least one of a Short Range Device frequency band or an Industrial, Scientific, Medical frequency band.

20. A method for operating an electronic consumption-data acquisition device, the method comprising the following steps:
using a first radio system to wirelessly transfer consumption data to a receiver;
providing a first operating mode for operating the consumption-data acquisition device, and transferring the consumption data by using the first radio system in the first operating mode;
providing a second operating mode for operating the consumption-data acquisition device, and providing the second operating mode with a lower rate of at least one of transmission or readiness to receive data compared with the first operating mode;
using a second radio system to switchover between the first operating mode and the second operating mode;
providing a multiplicity of individual consumption-data acquisition devices for conveying the consumption data to the receiver; and
using the second radio system to select from the multiplicity of individual consumption-data acquisition devices an individual consumption-data acquisition device being switched between the first operating mode and the second operating mode.

21. The method according to claim 20, which further comprises providing the second radio system with a larger range than the first radio system.

22. The method according to claim 20, which further comprises providing the second operating mode of the consumption-data acquisition device with a lower power consumption in a non-transmit mode than the first operating mode.

23. The method according to claim 20, which further comprises placing the first radio system partially or fully in a deactivated state in the second operating mode.

24. The method according to claim 20, which further comprises individually altering switchover times between the first and second operating modes according to a planned transfer of the consumption data.

25. The method according to claim 20, which further comprises including at least one of enabling or disabling of the first radio system in the switchover between the first and second operating modes.

26. The method according to claim 20, which further comprises storing at least one transmission schedule in the consumption-data acquisition device, and using the second radio system to at least one of configure or activate or deactivate the transmission schedule.

27. The method according to claim 20, which further comprises using the second radio system to configure parameters of the first radio system.

28. The method according to claim 20, which further comprises using at least one of a Short Range Device frequency band or an Industrial, Scientific, Medical frequency band for the first radio system.

29. The method according to claim 20, which further comprises providing the individual consumption-data acquisition devices with individual transmission schedules.

30. The method according to claim 20, which further comprises providing a mobile data collector or a stationary data collector as the receiver.

31. A consumption-data acquisition device, comprising:
a first radio system;

a first operating mode for operating the consumption-data acquisition device to transfer consumption data over said first radio system;

a second operating mode for operating the consumption-data acquisition device with at least one of a lower rate of transmission or readiness to receive data compared with the first operating mode;

a second radio system performing a switchover between said first and second operating modes;

a measuring unit for acquiring the consumption data;

a memory connected to said measuring unit for storing the consumption data;

at least one processor connected to said measuring unit;

a communication module connected to said measuring unit for transferring the consumption data over said first radio system, said communication module having a radio apparatus for said second radio system;

the consumption-data acquisition device being one of a multiplicity of individual consumption-data acquisition devices for conveying the consumption data to a receiver; and said second radio system configured to select from the multiplicity of individual consumption-data acquisition devices an individual consumption-data acquisition device being switched between the first operating mode and the second operating mode.

32. The consumption-data acquisition device according to claim 31, wherein said second radio system has a larger range than said first radio system.

33. The consumption-data acquisition device according to claim 31, wherein the second operating mode of the consumption-data acquisition device has a lower power consumption in a non-transmit mode than the first operating mode.

34. The consumption-data acquisition device according to claim 31, wherein said first radio system is partially or fully in a deactivated state in the second operating mode.

35. The consumption-data acquisition device according to claim 31, wherein the switchover between the first and second operating modes includes at least one of enabling or disabling said first radio system.

36. The consumption-data acquisition device according to claim 31, wherein said memory stores at least one transmission schedule to be at least one of configured or activated or deactivated over said second radio system.

37. The consumption-data acquisition device according to claim 31, wherein said first radio system has parameters to be configured over said second radio system.

38. The consumption-data acquisition device according to claim 31, wherein said first radio system uses at least one of a Short Range Device frequency band or an Industrial, Scientific, Medical frequency band.

* * * * *